March 23, 1954
V. D. HANES
2,672,768
COMPOUNDING TRANSMISSION AND CLUTCH ASSEMBLY THEREFOR
Filed Dec. 1, 1949
2 Sheets-Sheet 1
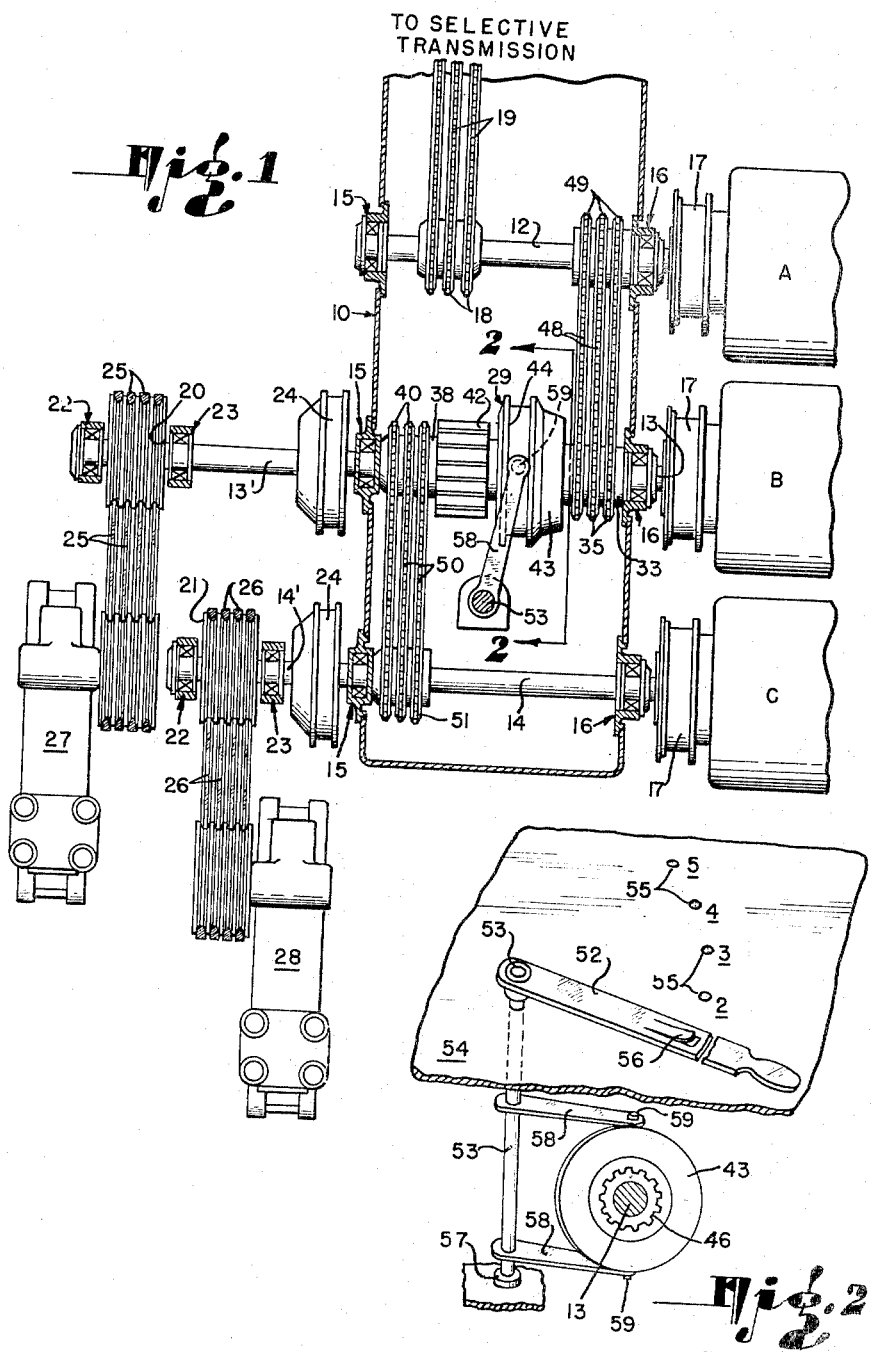
INVENTOR.
VAUGHN DEAN HANES
BY
ATTORNEY

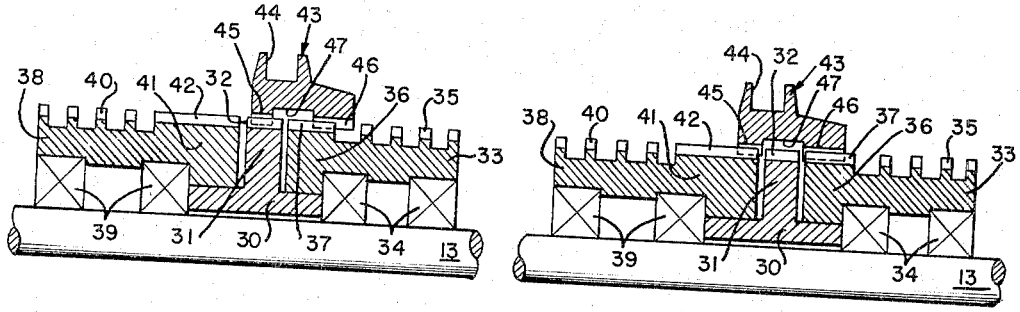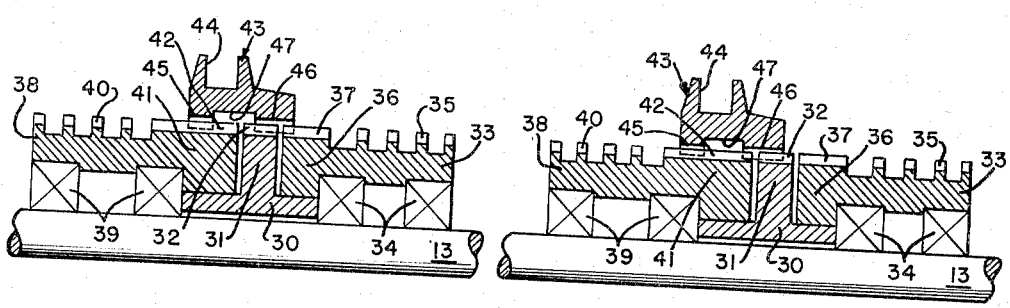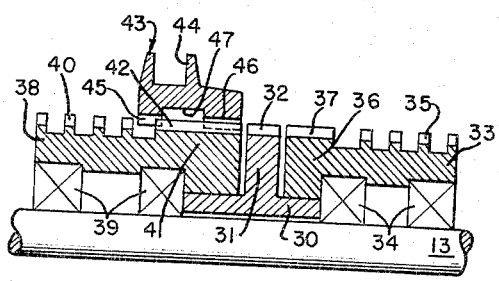

Patented Mar. 23, 1954

2,672,768

UNITED STATES PATENT OFFICE 2,672,768

COMPOUNDING TRANSMISSION AND CLUTCH ASSEMBLY THEREFOR

Vaughn Dean Hanes, Los Angeles, Calif., assignor to Emsco Manufacturing Company, Los Angeles, Calif., a corporation of California Application December 1, 1949, Serial No. 130,532

2 Claims. (Cl. 74—722)

The present invention relates generally to power means for the operation of the various devices constituting the drilling equipment of an an oil well; and is more particularly concerned with novel means for selectively connecting and distributing power from a plurality of sources, such as internal combustion engines.

As is generally known in the oil well drilling art, the usual devices employed in the drilling operation have different power requirements and may be required at certain times to operate singly, and at other times simultaneously in combination. This diversity of power requirements is compensated for by the utilization of some form of compounding transmission, by means of which a plurality of power sources such as internal combustion engines may be efficiently connected and their power distributed through a plurality of clutch assemblies so that all of the engines may be compounded for full load requirements, and at other times a single engine may be utilized for operating devices requiring less power.

With the foregoing in mind, it is an object of the present invention to provide in a simplified compounding transmission a novel selector means operable from a single remote position for selectively interconnecting and controlling the transmission of power between a plurality of power delivery shafts which are connected to individual power sources, such as internal combustion engines.

A further object is to provide an improved novel multi-position clutch arrangement which may be mounted on one power delivery shaft of a compounding transmission, and is so arranged as to be actuatable by a single operating lever to selectively interconnect this shaft with two other rotatable members, such as, for example, power delivery shafts.

Further objects and advantages of the invention will be brought out in the following part of the specification, wherein detailed description is employed for the purpose of disclosing the invention without limiting its scope.

Referring to the drawings, which are for illustrative purposes only:

Fig. 1 is a fragmentary horizontal sectional view illustrating a compounding transmission embodying the features of the present invention, the various elements having been shown more or less schematically, since the invention does not consist in the specific details of construction, but in the novel manner in which the parts are combined and interconnected;

Fig. 2 is a fragmentary isometric view showing details of the clutch operating mechanism utilized in the present invention, a section being taken substantially on line 2—2 of Fig. 1; and Figs. 3 to 7 inclusive are partial axial sections through the clutch mechanism respectively showing more or less diagrammatically the operative positions of the clutch parts.

As illustrated in Fig. 1, the present invention contemplates generally a compounding transmission which will permit the selective connection and distribution of power from a plurality of power sources, which may assume various types but have been illustrated as comprising internal combustion engines A, B and C positioned in side by side alignment along one side of a compounding transmission casing 10.

The engines A, B and C are respectively connected to power delivery drive shafts 12, 13 and 14, these shafts being arranged in parallel within the casing and in each case rotatably journaled in suitable bearing structures 15 and 16 supported in the side walls of the casing. Each of the engines is connected with its associated drive shaft through a conventional clutch 17 of friction or hydraulic type by means of which the delivery of power may be independently controlled from the respective engines to their associated drive shafts.

As shown in Fig. 1, the engines A and C are positioned outward of engine B so that shaft 12 is located at one end of the casing 10 and the shaft 14 at the other end. Shaft 12 is provided with a sprocket 18 which is keyed or otherwise secured to the shaft for rotation therewith. This sprocket is adapted to be connected through a suitable flexible transmission connection 19 with the driving mechanism of an associated draw works or rotary table (not shown) or to a selective transmission, as indicated.

The shafts 13 and 14 of engines B and C respectively are extended on the opposite side of the casing 10 from that on which the engines are mounted, the extensions being indicated at 13' and 14'. The shaft extensions 13' and 14' have fixably secured thereon for rotation therewith driving sheaves 20 and 21, the shaft extensions being supported at the sheaves in conventional bearings 22 and 23. The shaft extensions are respectively detachably connectable in each case with the main shafts through a clutch 24 which is mounted exteriorly of the casing.

The shaft extension 13' is of greater length than the shaft extension 14' so that the sheaves 20 and 21 will be offset so as to permit their connection through flexible transmission connections 25 and 26 with mud pumps 27 and 28, as indicated at the opposite end of the casing 10 from that at which the selective transmission is located.

In the arrangement thus far described, the engine A would be available only for driving the drilling equipment, and engines B and C would be available respectively for driving independently the mud pumps. Due to the requirement of full power developed by all the engines for certain operations, it becomes necessary in order to have a flexible arrangement to make provision so that the three engines A, B and C may be compounded, and also that under certain circumstances two engines may be utilized for driving one or the other of the mud pumps.

In the present invention, flexibility of power distribution is accomplished in a novel manner by the provision of a multi-position clutch mechanism as generally indicated by numeral 29, this clutch mechanism being associated with shaft 13 of engine B and transmission connections with shafts 12 and 14 as will hereinafter be described.

As shown in Fig. 3, a body having the form of a collar 30 is keyed or otherwise secured to the shaft 13 for rotation therewith. This collar is provided intermediate its ends with a projecting circumferentially extending flange 31 which is formed around its periphery with clutch teeth 32.

On one side of the collar 30, there is provided a second body or quill 33 which is rotatively supported on the shaft 13 by suitable bearings 34 and formed on its exterior surface to provide a sprocket 35. The inner end of the quill 33 is formed with an extension 36 of tubular construction so as to extend over the adjacent end of the collar 30. This extension is provided on its exterior surface with clutch teeth 37 which are aligned with clutch teeth 32.

A similar body or quill 38 is positioned on the opposite side of collar 30 and is rotatively supported on the shaft 13 by suitable bearings 39. This quill is in a similar manner provided on its exterior surface with a sprocket 40 and an extension 41 at its innermost end which extends over the adjacent end of the collar 30 and has clutch teeth 42 on its outer surface which are alignable with clutch teeth 32.

Associated with the three clutch bodies consisting of collar 30 and quills 33 and 38 is a fourth clutch body shown as a concentrically disposed and axially shiftable clutch ring 43 having its exterior surface provided with a circumferentially extending groove 44. Internally the clutch ring is provided with a set of internal clutch teeth 45 at one end and another set of internal clutch teeth 46 at the opposite end. It will be observed that the sets of clutch teeth 45 and 46 are separated by an internal groove 47, this groove being of such width as to rotatably receive the teeth and permit shifting of the clutch ring to a position wherein the clutch teeth 42 and clutch teeth 37 may be interconnected for driving the quills as a unit. Moreover, it will be noted that the overall length of the clutch teeth 45 and 46 is of such extent from outer end to outer end thereof that the ring may be shifted to a position wherein both sets of teeth on the ring are engaged with clutch teeth 42 on the quill 38.

As shown in Fig. 1, the sprocket 35 is connected through a flexible transmission connection 48 with a rotatable member comprising a sprocket 49 keyed or otherwise secured to the shaft 12 for rotation therewith. The sprocket 40 is connected through a flexible transmission connection 50 with another rotatable member comprising a sprocket 51 fixedly secured to the shaft 14 for rotation therewith.

From the description above of the clutch 29, it will be seen that there are five clutch positions. Provision is made for shifting the clutch ring 44 to each of the these positions by actuation of a single operating member which is shown in Fig. 2 as comprising an elongate lever 52 which is connected at one end to a shaft 53 for swinging movement over the upper enclosing wall 54 of the compounding transmission casing 10. Five dwell points as indicated by numeral 55 are provided along an arc of movement of the lever 52 in the casing wall and are arranged to cooperate with a suitable spring detent means 56 to releasably retain the lever 52 in shifted positions of movement.

The shaft 53 is vertically positioned and supported for rotation in suitable bearings 57. A pair of projecting arms 58—58 are fixedly secured to the shaft 53 in spaced relation, and at their outermost ends are slidably connected with the clutch ring 43 by means of pins 59 supported at the outermost end of the arms 58 and arranged to extend into the groove 44 so as to permit rotational movement of the clutch ring and yet enable axial shifting thereof by swinging the lever 52 from one draw position to the other.

Beginning with the control lever 52 in the first position, the clutch parts will be in the position shown in Fig. 3, wherein the quill 33 is connected to the collar 30 to cause the sprocket 35 to rotate with the shaft 13. Shafts 12 and 13 are therefore interconnected for unitary rotation.

With the lever on position 2, the parts will be as shown in Fig. 4 with the clutch ring 43 straddling the clutch teeth 32 on the collar 30 and its teeth clutchingly engaging the teeth of quills 33 and 38 so that they will rotate as a unit on the shaft 13. As thus connected, the shaft 13 is free to rotate independently, but shaft 12 and shaft 14 will be interconnected for unitary operation.

In the position 3 of the lever 52, the clutch ring 43 will be shifted as shown in Fig. 5, wherein the clutch teeth 46 of the ring engages with clutch teeth 37 and 32 so as to interconnect the collar and quill 33, and the clutch teeth 45 will engage with clutch teeth 42 of quill 38. Thus, the collar 30, quill 33 and quill 38 are clutchingly engaged and the shafts 12, 13 and 14 will thus be interconnected for unitary operation.

By further shifting of the lever 52 so as to be in position 4, the clutch ring 43 will be further shifted to a position as shown in Fig. 6, wherein the clutch teeth 46 will now engage clutch teeth 32 of the collar 30 and clutch teeth 42 of the quill 38. Under such conditions, shaft 13 and 14 will be connected for unitary operation, whereas quill 33 now being rotatable on shaft 13 will permit independent operation of shaft 12.

When the lever 52 is shifted to its position 5, as shown in Fig. 7, the clutch ring 43 has both sets of teeth 45 and 46 in engagement with the clutch teeth 42 of the quill 38, so that the shafts 12, 13 and 14 will be free for independent operation.

The multi-position clutching arrangement contained on a single shaft and operable by a single control lever provides a simple but extremely flexible arrangement by which the power from a plurality of engines may be distributed and compounded for actuation of the various devices utilized particularly for the drilling of oil wells,

I claim as my invention:

1. In a power transmission apparatus for selectively connecting a shaft member to two rotatable members: a first clutch body on said shaft member, said clutch body having first clutch teeth projecting therefrom; means for connecting said first clutch body to said shaft; a second clutch body rotatably mounted on said shaft adjacent one side of said first clutch body, said second clutch body having second clutch teeth projecting therefrom; a third clutch body rotatably mounted on said shaft adjacent the opposite side of said first clutch body, said third clutch body having third clutch teeth projecting therefrom; transmission means for connecting said second and third clutch bodies respectively to said two rotatable members; a clutch sleeve disposed in external relation to said first, second and third clutch bodies and being shiftable axially of said shaft and along the exteriors of said clutch bodies, said sleeve having clutch teeth spaced axially so that when said sleeve is in an intermediate position said spaced teeth will be in straddling relation to said first clutch teeth and will respectively engage said second and third clutch teeth, so that when said sleeve is shifted into a first position teeth of said sleeve will engage said first, second, and third clutch teeth, whereby connecting all of said clutch bodies for simultaneous rotation, into a second position so that when said sleeve is shifted teeth of said sleeve will connect said first and second clutch teeth, and so that when said sleeve is shifted into a third position teeth of said sleeve will connect said first and third clutch teeth, said sleeve being arranged so that it may be shifted to a position wherein its teeth will be disengaged from the teeth of at least two of said clutch bodies so that all of said clutch bodies will be free of interconnection by said sleeve; and means for shifting said sleeve between said positions thereof.

2. In a power transmission apparatus for selectively connecting a shaft member to two rotatable members: a first clutch body on said shaft member, said clutch body having first clutch teeth projecting therefrom; means for connecting said first clutch body to said shaft; a second clutch body rotatably mounted on said shaft adjacent one side of said first clutch body, said second clutch body having second clutch teeth projecting therefrom; a third clutch body rotatably mounted on said shaft adjacent the opposite side of said first clutch body, said third clutch body having third clutch teeth projecting therefrom; transmission means for connecting said second and third clutch bodies respectively to said two rotatable members; a fourth clutch body disposed in external relation to said first, second and third clutch bodies and being shiftable axially of said shaft and along the exteriors of said clutch bodies said fourth clutch body having clutch teeth spaced axially so that when said fourth clutch body is in an intermediate position said spaced teeth will be in straddling relation to said first clutch teeth and will respectively engage said second and third clutch teeth, so that when said fourth clutch body is shifted into a first position teeth of said fourth clutch body will engage said first, second and third clutch teeth, thereby connecting all of said clutch bodies for simultaneous rotation, into a second position so that when said fourth clutch body is shifted teeth of said fourth clutch body will connect said first and second clutch teeth, and so that when said fourth clutch body is shifted into a third position teeth of said fourth clutch body will connect said first and third clutch teeth, said fourth clutch body being arranged so that it may be shifted to a position wherein its teeth will be disengaged from the teeth of at least two of the remaining clutch bodies so that said first, second and third clutch bodies will be free of interconnection by said fourth clutch body; and means for shifting said fourth clutch body between said positions thereof.

VAUGHN DEAN HANES.

References Cited in the file of this patent

UNITED STATES PATENTS

| Number | Name | Date |
|---|---|---|
| 902,692 | Sherman | Nov. 3, 1908 |
| 1,696,179 | Ahlm | Dec. 25, 1928 |
| 1,990,810 | Young | Feb. 12, 1935 |
| 2,022,480 | Robbins | Nov. 26, 1935 |
| 2,106,087 | Davey | Jan. 18, 1938 |
| 2,488,069 | Spalding | Nov. 15, 1949 |
| 2,536,483 | Young | Jan. 2, 1951 |
| 2,539,584 | Maier | Jan. 30, 1951 |
| 2,541,625 | Webster | Feb. 13, 1951 |

FOREIGN PATENTS

| Number | Country | Date |
|---|---|---|
| 735,724 | France | Nov. 14, 1932 |